Patented Nov. 2, 1926.

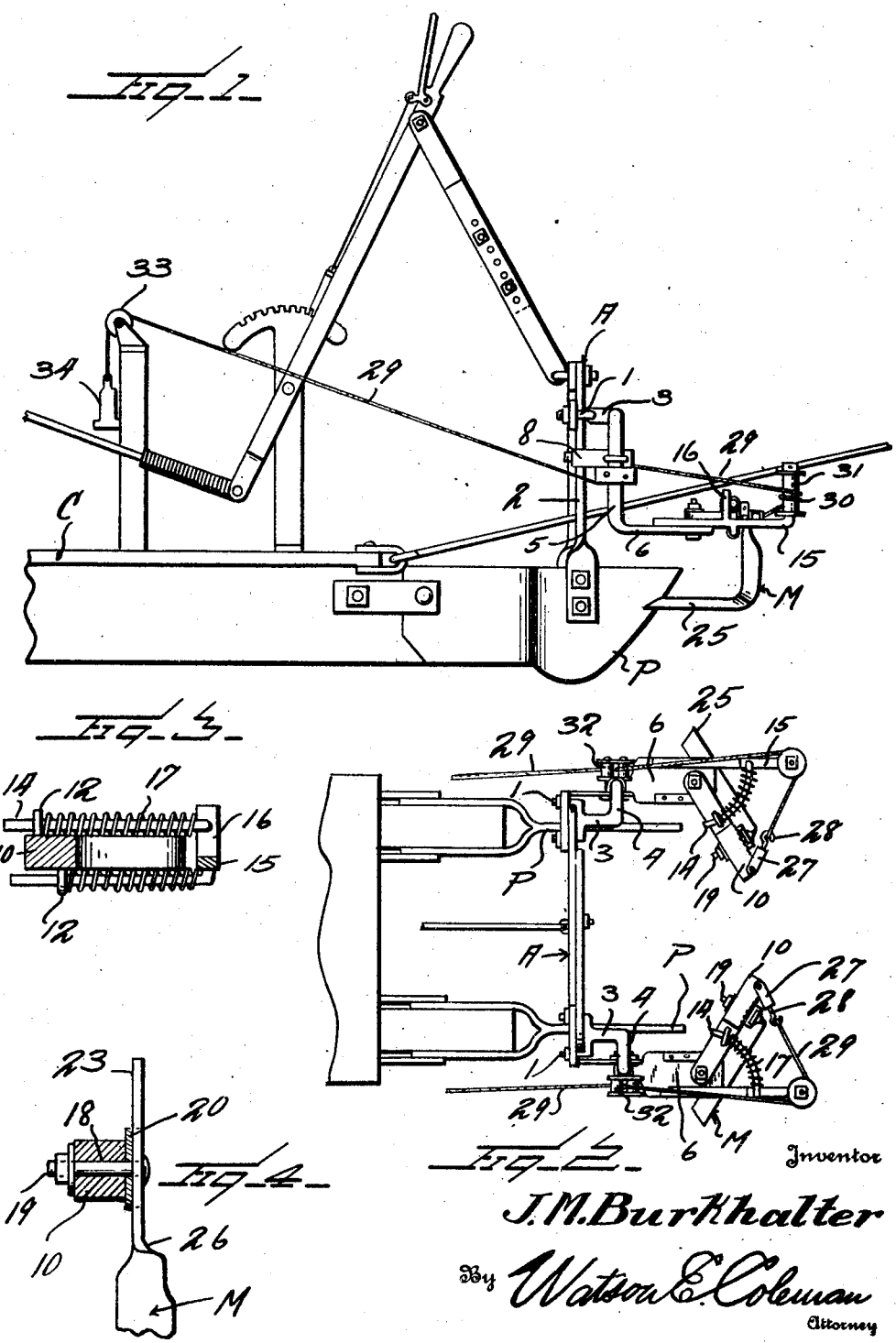

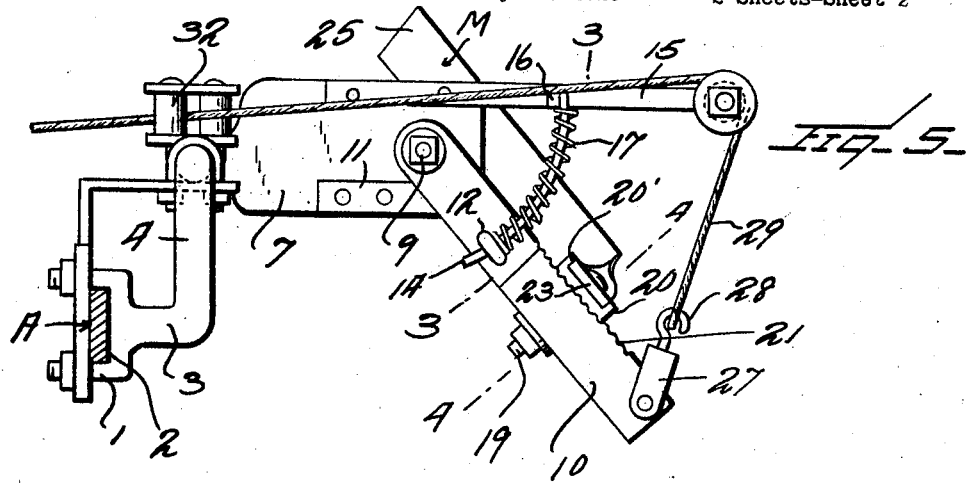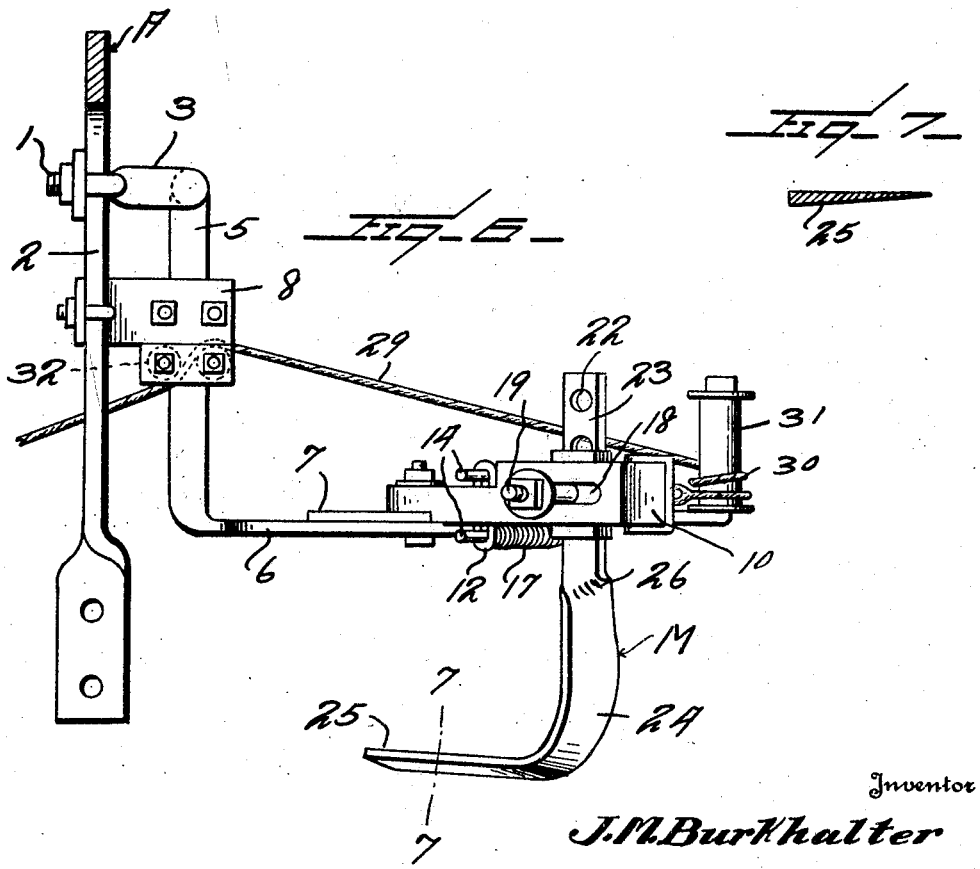

1,605,706

UNITED STATES PATENT OFFICE.

JOHN M. BURKHALTER, OF CANYON, TEXAS.

CULTIVATOR ATTACHMENT.

Application filed July 18, 1925. Serial No. 44,550.

This invention relates to certain improvements in cultivator attachments and has relation more to a device of this general character operating as a whole to destroy weeds or the like.

It is an object of the invention to provide a device of this kind operating in a manner to work up close to the plants of a row and which comprises a hoe member or knife supported for lateral swinging movement to permit the same to be readily thrown out of the way from the plants when the requirements of practice may so necessitate.

Another object of the invention is to provide an attachment of this kind wherein the hoeing member or blade may work close to the crop and may be adjusted as desired to assure a maximum of efficiency.

The invention has for a further object to provide a hoe member or cutting knife which operates effectively not only to cut the weeds or the like within the middle row but to cause said severed weeds and other trash to pass toward the center of the middle row and thereby effectively avoid choking or other interference which would otherwise effect the efficiency of the attachment.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a cultivator attachment constructed in accordance with an embodiment of my invention in applied position, the coacting cultivator or go-devil being shown in fragment;

Figure 2 is a view in top plan of my improved attachment as herein disclosed in applied position;

Figure 3 is a detailed sectional view taken substantially on the line 3—3 of Figure 5;

Figure 4 is a detailed sectional view taken substantially on the line 4—4 of Figure 5;

Figure 5 is an enlarged fragmentary view in top plan of the device as herein disclosed with a part in section;

Figure 6 is an enlarged view in elevation taken at the inner side of a device as herein disclosed;

Figure 7 is a sectional view taken substantially on the line 7—7 of Figure 6.

As disclosed in the accompanying drawings, A denotes an arch member extending transversely with respect to the cultivator or go-devil C proper, said arch member being herein disclosed as supported by the plows P of the type comprised in my device as disclosed in my pending application Serial No. 43,015 filed July 11, 1925, although it is to be understood that this arch member may be otherwise supported as the requirements of practice may prefer.

An attachment constructed in accordance with an embodiment of my present invention is adapted to be employed at each side of a plant row and as both of these attachments are duplicate a detailed description of one will suffice for the purposes of disclosure.

Each of my improved attachments, as herein disclosed, has clamped, as at 1, to a side arm 2 of the arch member A an end portion of the forwardly directed arm 3, the outer end of the arm 3 being continued by an outwardly and laterally disposed arm 4 substantially at right angles thereto. The arm 4 is continued by a depending arm 5 of requisite length. The lower end of the arm 5 is provided with a forward extension 6 which carries a horizontally arranged plate or table 7.

The upper portion of the arm 5 is braced or further supported by a bracket 8 suitably secured thereto and also fixed to the adjacent portion of the side arm 2 of the member A.

The forward portion of the plate 7 has pivotally connected therewith, as at 9, an end portion of a forwardly and normally inwardly directed arm 10 the outward movement of which being limited by having its pivoted portion contact with a stop plate 11 suitably fixed to the plate 7. The arm 10 outwardly of the plate 7 but relatively close thereto has its upper and lower faces provided with the outstanding eye or guide members 12 through which are freely disposed the curved rods 14, each of said rods being secured to the inner portion of a rod 15 carried by the plate 7 and extending a desired distance in advance thereof. As herein disclosed, the upper rod 14 is operatively engaged with an upstanding post 16 carried by the rod 15 so that said curved rods 14 will be properly spaced.

Surrounding each of the rods 14 and interposed between an eye or guide member 12 and the rod 15 or post 16 is a coil spring 17 providing a medium whereby the arm 10 is constantly urged and maintained at its limit of outward movement.

The outer portion of the arm 10 has disposed laterally therethrough a slot 18 extending lengthwise thereof and through which is directed a clamping bolt 19, said bolt being also disposed through a flanged plate 20. By this means, the plate 20 may have its position adjusted lengthwise of the arm 10 as may be preferred and in order to prevent said flanged plate 20 from having swinging or rotary movement about the bolt 19 the inner face thereof and the adjacent face of the arm 10 is provided with the corrugations or teeth 21 adapted to intermesh or interlock. The bolt 19 is also adapted to be selectively directed through an opening 22 in the shank 23 of a knife or hoe member M, said shank overlying the plate 20 and substantially snugly fitting between the flanges 20' thereof so that the knife or member M is effectively maintained against rotary movement about the bolt 19. The knife or hoe member immediately adjacent to the lower end of the shank 23 is disposed, as at 24, on a predetermined curvature with the lower end of such curvature being continued by an elongated portion 25. It is to be noted that the curved portion 24 and its extended portion 25 is turned or twisted, as at 26, with respect to the shank 23 substantially a one quarter turn although this may be varied in accordance with conditions.

In practice, as the cultivator or go-devil advances, the arm 10 will be disposed inwardly toward the row at an angle of approximately 45° bringing the curved portion 24 of the hoe member or knife M relatively close to such row and the curved portion 24 together with its extension 25 having their forward margins provided with knife edges to cut weeds, grass or the like, and the angle of inclination of the member M in addition to effectively cutting and destroying such growth will cause the severed weeds or the like to pass outwardly toward the outer end of the extension 25 or the center of the middle row whereby it is assured that the efficiency of the attachment will not be handicapped or retarded by clogging and the like.

As the cultivator or go-devil advances along a plant row, it may occur that the knife or hoe member M will come too close to the crop at points along the row and under such conditions the arm 10 is adapted to be swung inwardly toward the arm 15 to bring the extension 25 of the knife or hoe member M into a position substantially parallel with the row or to move the same outwardly to an extent sufficient to prevent any portion of the knife or hoe member M cutting the crop.

It is to be particularly noted, as illustrated in Figure 5, that the extension 25 of the knife or hoe member M is disposed substantially in parallelism with the arm 10 whereby the knife has an effective scope of operation between the rows.

The outer end of the arm 10 has pivotally connected therewith a clevis 27 with which is operatively engaged, as at 28, an end portion of a flexible member 29. This member 29 is wrapped around, as at 30, an upstanding pulley or drum 31 carried by the outer end of the arm 15 and is continued rearwardly toward the arm 5 and disposed between the guide pulleys 32 suitably supported by said arm 5. The flexible member 29 is then continued over the forward portion of the cultivator or go-devil proper and disposed over a suitable guide member 33 and depending therefrom, said inner end of the flexible member 29 having affixed thereto a suitable stirrup 34. An occupant of the usual seat of the cultivator or go-devil engages a foot with said stirrup 34 and when it is desired to swing the arm 10 inwardly it is only necessary to exert sufficient pressure upon said stirrup. Upon release of the pressure the springs 17 will return the arm 10 to its outward or normal position although it is to be stated at this time that the arrangement of the knife or member M as it works the ground will also positively assure such return.

The extent of penetration of the knife or member M may be varied or regulated by shifting the connection 1 to different points along the side arm 2 of the arch member A.

From the foregoing description it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the princples and spirit thereof and for this reason I do not wish to be understood as limiting myself to the precise arrangement and formation of the several parts herein shown in carrying out my invention in practice except as hereinafter claimed.

I claim:—

1. In combination with a cultivator including a plow, an upstanding member carried by said plow, a horizontally disposed plate supported by said upstanding member and arranged above the plow and extending in advance thereof, a normally inwardly directed arm pivotally connected with the plate, a stop carried by the plate with which the arm contacts to determine the normal inward position of the arm, yieldable means for maintaining said arm in its normal position, a ground working member secured to and depending from the arm, and means for imparting outward swinging movement to the arm.

2. In combination with a cultivator including a plow, an upstanding member carried by said plow, a horizontally disposed plate supported by said upstanding member and arranged above the plow and extending in advance thereof, a normally inwardly directed arm pivotally connected with the plate, a stop carried by the plate with which the arm contacts to determine the normal inward position of the arm, yieldable means for maintaining the arm in its normal position, a ground working member secured to and depending from the arm, and means for imparting outward swinging movement to the arm, said ground working member including a vertically disposed shank, said shank being secured to the arm at a point beyond the inner side of the plow, the lower portion of the shank having a lateral extension constituting a hoe, said extension being of a length to extend beyond the outer side of the plow when the arm is in its normal position.

3. In combination with a cultivator including a plow, an upstanding member carried by said plow, a horizontally disposed plate supported by said upstanding member and arranged above the plow and extending in advance thereof, a normally inwardly directed arm pivotally connected with the plate, a stop carried by the plate with which the arm contacts to determine the normal inward position of the arm, yieldable means for maintaining said arm in its normal position, a ground working member secured to and depending from the arm, a forwardly directed arm carried by the plate, a guide member carried by the outer end portion of said arm, a guide member carried by the upstanding member, and a flexible member secured to the outer portion of the swinging arm and engaged with the guide member of the elongated arm and the second guide member, said flexible member providing means to move said swinging arm outwardly.

In testimony whereof I hereunto affix my signature.

JOHN M. BURKHALTER.